United States Patent
Bartels et al.

(10) Patent No.: US 12,129,428 B2
(45) Date of Patent: Oct. 29, 2024

(54) SILICA SUBSTRATES FOR SLOW RELEASE ASPHALTENE CONTROL CHEMICAL SQUEEZE TREATMENTS

(71) Applicant: ChampionX USA Inc., Sugar Land, TX (US)

(72) Inventors: Jeremy Wayne Bartels, Sugar Land, TX (US); Christopher Alexander Russell, Sugar Land, TX (US); Duy T. Nguyen, Richmond, TX (US); Manojkumar Ramnikalal Bhandari, Sugar Land, TX (US); Rebecca Michele Lucente-Schultz, Missouri City, TX (US)

(73) Assignee: ChampionX LLC, Sugar Land, TX (US)

( * ) Notice: Subject to any disclaimer, the term of this patent is extended or adjusted under 35 U.S.C. 154(b) by 0 days.

(21) Appl. No.: 17/557,611

(22) Filed: Dec. 21, 2021

(65) Prior Publication Data
US 2022/0340806 A1    Oct. 27, 2022

Related U.S. Application Data

(60) Provisional application No. 63/176,757, filed on Apr. 19, 2021.

(51) Int. Cl.
C09K 8/524     (2006.01)
(52) U.S. Cl.
CPC .................................... C09K 8/524 (2013.01)

(58) Field of Classification Search
CPC . C09K 8/524; C09K 2208/10; Y10S 507/902; Y10S 507/93
See application file for complete search history.

(56) References Cited

U.S. PATENT DOCUMENTS

| | | | | |
|---|---|---|---|---|
| 5,494,607 | A | * | 2/1996 | Manek .................... C10L 10/04 507/90 |
| 5,853,619 | A | * | 12/1998 | Watson .................... C23F 11/10 422/12 |
| 6,380,136 | B1 | | 4/2002 | Bates et al. |
| 7,493,955 | B2 | | 2/2009 | Gupta et al. |

(Continued)

FOREIGN PATENT DOCUMENTS

| | | |
|---|---|---|
| WO | 2012134506 A1 | 4/2012 |
| WO | 2013033391 A1 | 3/2013 |

(Continued)

OTHER PUBLICATIONS

B. Alexander et al., The Solubility of Amorphous Silica in Water, Jun. 1954, The Journal of Physical Chemistry, 58 (6), 453-455 (Year: 1954).*

(Continued)

*Primary Examiner* — Aiqun Li
(74) *Attorney, Agent, or Firm* — Eric D. Babych; Barnes & Thornburg LLP

(57) ABSTRACT

The present disclosure provides methods and compositions for controlling asphaltenes in a subterranean formation. The compositions may include silica, a polymer, and optionally a charged surfactant. The compositions may also include a solvent or other additives. The methods may include injecting the compositions into subterranean formations and inhibiting asphaltene precipitation.

18 Claims, 3 Drawing Sheets

(56) References Cited

U.S. PATENT DOCUMENTS

| | | |
|---|---|---|
| 8,336,624 B2 | 12/2012 | Becker et al. |
| 9,951,267 B2 | 4/2018 | Duenckel et al. |
| 10,138,417 B2 | 11/2018 | Potisek et al. |
| 10,266,750 B2 | 4/2019 | Oghena et al. |
| 10,611,953 B2 | 4/2020 | Patil et al. |
| 10,641,083 B2 | 5/2020 | Shen et al. |
| 2014/0349894 A1 | 11/2014 | Quintero et al. |
| 2016/0137904 A1 | 5/2016 | Drake et al. |
| 2016/0145487 A1 | 5/2016 | Alam et al. |
| 2017/0198204 A1* | 7/2017 | Nguyen .............. F17D 1/17 |
| 2018/0118998 A1 | 5/2018 | Lavene et al. |
| 2018/0291257 A1 | 10/2018 | Howe et al. |
| 2018/0291284 A1 | 10/2018 | Sommese et al. |
| 2019/0177599 A1 | 6/2019 | Weers et al. |
| 2019/0368327 A1* | 12/2019 | Nguyen ............ C09K 8/665 |
| 2020/0157417 A1 | 5/2020 | Bhaduri et al. |
| 2020/0369948 A1 | 11/2020 | Andrade et al. |

FOREIGN PATENT DOCUMENTS

| | | | |
|---|---|---|---|
| WO | 2013112503 A1 | 8/2013 | |
| WO | 2014144464 A2 | 9/2014 | |
| WO | 2016014310 A1 | 1/2016 | |
| WO | 2016172212 A1 | 10/2016 | |
| WO | WO-2020028375 A1 * | 2/2020 | .............. C09K 8/03 |
| WO | 2020197607 A1 | 10/2020 | |
| WO | 2020205747 A1 | 10/2020 | |

OTHER PUBLICATIONS

Mohammed, Isah et al. "Asphaltene precipitation and deposition: A critical review," Journal of Petroleum Science and Engineering, 197, (2021), 107956, 1-28.

Leonard, Geoffrey C et al. "Novel Asphaltene Inhibitor for Direct Application to Reservoir." Paper presented at the SPE Kuwait Oil and Gas Show and Conference, Kuwait City, Kuwait, Oct. 2013. Society of Petroleum Engineers, Published Oct. 2013, SPE 167362, 1-5.

International Search Report and Written Opinion for International Application No. PCT/US2021/064661, mailed Apr. 14, 2022, 12 pages.

* cited by examiner

SILICA SUBSTRATES FOR SLOW RELEASE ASPHALTENE CONTROL CHEMICAL SQUEEZE TREATMENTS

TECHNICAL FIELD

The present disclosure generally relates to compositions and methods for controlling asphaltenes. More particularly, the disclosure relates to asphaltene inhibitor compositions comprising silica, polymers and optionally surfactants and other additives.

BACKGROUND

The two major solubility fractions of crude oils are maltenes and asphaltenes. Maltenes constitute the fraction of oil that is soluble in low molecular mass n-alkane solvents, such as n-pentane, n-hexane and n-heptane. Asphaltenes are defined as the crude oil fraction that is soluble in aromatic solvents and insoluble in low-boiling straight chain alkanes.

Asphaltene molecules have complex structures and are typically polar molecules with relatively high molecular weights (approximately 700 to 1,000 g/mol). Asphaltenes can contain carbon, hydrogen, nitrogen, oxygen, and sulfur, as well as trace amounts of transition metals, such as vanadium and nickel. Asphaltenes are typically stable under virgin reservoir conditions but can destabilize and precipitate from crude oil during production due to changes in temperature, pressure, chemical composition, and/or shear rate.

Asphaltene deposits can occur throughout the production system, from inside the reservoir formation to pumps, tubing, wellheads, safety valves, flow lines, and surface facilities used in the extraction process. Asphaltene deposits can cause production rate decline and other operational problems, such as increased fluid viscosity and density, and stabilization of oil-water emulsions. The nature of asphaltene deposits is determined by the composition of the crude oil and the conditions under which precipitation occurred.

Chemical treatment with additives, such as dispersants or inhibitors, is one of the most commonly adopted control options for the remediation and prevention of asphaltene deposition. Asphaltene inhibitors provide real inhibition in that they can shift asphaltene flocculation pressure and prevent aggregation of asphaltene molecules.

However, it may prove difficult to release the asphaltene inhibitors into the reservoir over a sustained period of time due to ineffective interaction between asphaltene inhibitors and reservoir rock. As a result, treatments must repeatedly, or even continuously, be undertaken to ensure that the requisite level of asphaltene inhibitor is continuously present.

Squeeze treatments are methods used in the oilfield to deliver chemicals to the reservoir. An asphaltene inhibitor squeeze treatment typically includes three steps. The first step, commonly referred to as the "preflush," prepares the wellbore and reservoir for the treatment. The second step, which may be referred to as the "main pill," adds the asphaltene inhibitor to the reservoir. The third step, commonly referred to as the "overflush," distributes the asphaltene inhibitor over a larger volume of the reservoir.

A squeeze treatment lifetime is the period of time after which a squeeze treatment must be repeated and relates to how quickly the asphaltene inhibitors are removed from the reservoir during production. Squeeze lifetimes are dependent on a number of factors, such as reservoir temperature, brine composition, reservoir mineralogy, and asphaltene inhibitor chemistry. In an attempt to reduce the number of squeeze treatments in a given well, and thereby simplify the logistics and improve the economics of the treatment, modifications to the treatment procedures have been developed that are targeted at extending squeeze lifetimes. These modifications, while offering a degree of squeeze life enhancement, are not without their drawbacks.

BRIEF SUMMARY

The present disclosure provides methods and compositions for controlling asphaltenes. In some embodiments, a method of controlling asphaltenes comprises adding an asphaltene inhibitor to a hydrocarbon in a subterranean formation, wherein the asphaltene inhibitor comprises silica, a polymer and optionally a charged surfactant. The optional charged surfactant comprises an amine and/or amide group and the silica is at least partially water-soluble.

In some embodiments, the charged surfactant comprises a weight average molecular weight ranging from about 100 Da to about 1,000 Da.

In certain embodiments, the charged surfactant comprises an imidazoline or an imidazolinium.

In some embodiments, the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

In certain embodiments, the charged surfactant comprises a member selected from the group consisting of

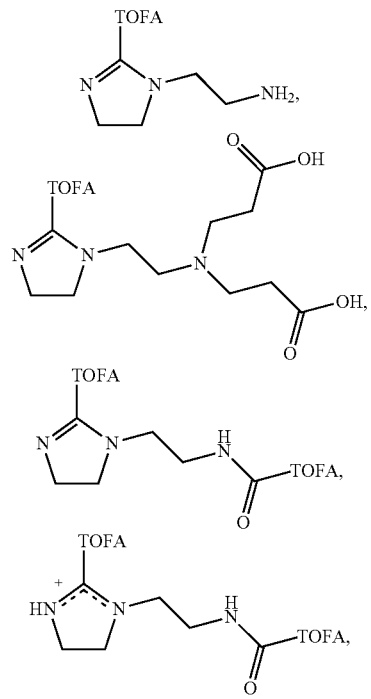

and any combination thereof.

In some embodiments, the charged surfactant is nonpolymeric.

In some embodiments, the polymer is nonionic. The polymer may comprise, for example, a weight average molecular weight ranging from about 500 Da to about 500,000 Da.

In certain embodiments, the polymer comprises a monomer selected from the group consisting of isobutylene, butadiene, isoprene, ethylene, propylene, an acrylate, acrylamide, methacrylate, methacrylamide, and any combination thereof.

In some embodiments, the polymer is an alkyl phenol-formaldehyde polymer, an alkyl phenol-amine-formaldehyde polymer, a polyalkylene, a polyisobutylene succinic ester or a polyisobutylene succinimide.

In certain embodiments, the polymer comprises about 10 mole % to about 90 mole % of a nonylphenol and about 10 mole % to about 90 mole % of formaldehyde.

In some embodiments, the polymer is a polyisobutylene succinic anhydride pentaerythritol ester, a dinonylphenol-formaldehyde-nonylphenol polymer, or a 4-nonylphenol-formaldehyde-diethylenetriamine.

In certain embodiments, the charged surfactant is an anionic surfactant, a cationic surfactant, an amphoteric surfactant, a zwitterionic surfactant, or any combination thereof.

In some embodiments, the silica is at least 0.01% water-soluble to about 40% water-soluble.

In certain embodiments, the silica is selected from the group consisting of colloidal silica, mesoporous silica, silica-based nanoparticles, porous silica, non-porous silica, fumed silica, silica gel, and any combination thereof. In certain embodiments, the silica is selected from the group consisting of fumed silica, mesoporous silica, nanosilica, and any combination thereof.

In some embodiments, the silica comprises a surface area of about 200 $m^2/g$ to about 600 $m^2/g$. In some embodiments, the silica comprises a particle size ranging from about 5 nm to about 1,000 nm.

In certain embodiments, the asphaltene inhibitor comprises from about 1 wt. % to about 95 wt. % of the polymer, from about 1 wt. % to about 50 wt. % of the optional charged surfactant, and from about 1 wt. % to about 95 wt. % of the silica. In certain embodiments, the asphaltene inhibitor comprises a solvent.

The present disclosure also provides methods of controlling asphaltenes comprising adding an asphaltene inhibitor to a hydrocarbon in a subterranean formation, wherein the asphaltene inhibitor comprises silica, a polymer and optionally a charged surfactant. The optional charged surfactant comprises an amine and/or amide group and the silica comprises a surface area greater than about 200 $m^2/g$.

Also disclosed are methods of controlling asphaltenes in a subterranean formation comprising preflushing the subterranean formation with an aqueous solution, delivering an asphaltene inhibitor to a wellbore of the subterranean formation, wherein the asphaltene inhibitor comprises silica, a polymer, and optionally a charged surfactant, wherein the silica is at least partially water-soluble, transporting the asphaltene inhibitor to a surface within the subterranean formation, and controlling asphaltenes in the subterranean formation.

In some embodiments, the asphaltene inhibitor may be added during the preflush and/or transporting steps. In some embodiments, silica may be added during the preflush step, the delivering step, and/or the transporting step. In some embodiments, the polymer may be added during the preflush step, the delivering step, and/or the transporting step. In some embodiments, the surfactant may be added during the preflush step, the delivering step, and/or the transporting step. In some embodiments, silica may be added during a step without the addition of the polymer and/or surfactant in the same step and in certain embodiments, polymer and/or surfactant may be added during a step without the addition of silica in the same step.

The present disclosure also provides asphaltene inhibitor compositions. In some embodiments, a composition comprises silica, wherein the silica is at least partially water-soluble, a surfactant, wherein the surfactant is a charged surfactant comprising an amine and/or amide group, and a polymer.

In some embodiments, the composition consists of, or consists essentially of, the silica, the polymer, and the charged surfactant. In some embodiments, the composition consists of, or consists essentially of, the silica, the polymer, the charged surfactant, and a solvent.

The charged surfactant may comprise a weight average molecular weight ranging from about 100 Da to about 1,000 Da.

In some embodiments, the charged surfactant comprises an imidazoline or an imidazolinium.

In certain embodiments, the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

In some embodiments, the charged surfactant comprises a member selected from the group consisting of

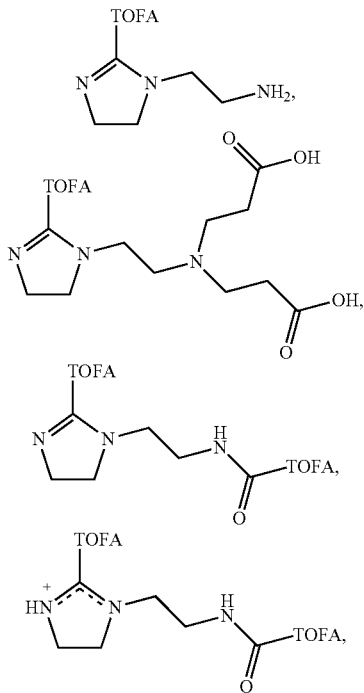

and any combination thereof.

In certain embodiments, the charged surfactant is non-polymeric.

In some embodiments, the polymer is nonionic. The polymer may comprise a weight average molecular weight ranging from about 500 Da to about 500,000 Da.

In certain embodiments, the polymer comprises a monomer selected from the group consisting of isobutylene, butadiene, isoprene, ethylene, propylene, an acrylate, acrylamide, methacrylate, methacrylamide, and any combination thereof.

In some embodiments, the polymer is an alkyl phenol-formaldehyde polymer, an alkyl phenol-amine-formaldehyde polymer, a polyalkylene, a polyisobutylene succinic ester or a polyisobutylene succinimide.

In certain embodiments, the polymer comprises about 10 mole % to about 90 mole % of a nonylphenol and about 10 mole % to about 90 mole % of formaldehyde.

In some embodiments, the polymer is a polyisobutylene succinic anhydride pentaerythritol ester, a dinonylphenol-formaldehyde-nonylphenol polymer, or a 4-nonylphenol-formaldehyde-diethylenetriamine.

In certain embodiments, the charged surfactant is an anionic surfactant, a cationic surfactant, an amphoteric surfactant, a zwitterionic surfactant, or any combination thereof.

In some embodiments, the silica is at least 0.01% water-soluble to about 40% water-soluble.

In certain embodiments, the silica is selected from the group consisting of colloidal silica, mesoporous silica, silica-based nanoparticles, porous silica, non-porous silica, fumed silica, silica gel, and any combination thereof. In certain embodiments, the silica is selected from the group consisting of fumed silica, mesoporous silica, nanosilica, and any combination thereof.

In some embodiments, the silica comprises a surface area of about 200 $m^2/g$ to about 600 $m^2/g$. In some embodiments, the silica comprises a particle size ranging from about 5 nm to about 1,000 nm.

In certain embodiments, the asphaltene inhibitor comprises from about 1 wt. % to about 95 wt. % of the polymer, from about 1 wt. % to about 50 wt. % of the charged surfactant, and from about 1 wt. % to about 95 wt. % of the silica. In certain embodiments, the asphaltene inhibitor comprises a solvent.

The present disclosure also provides a composition comprising silica, wherein the silica comprises a surface area of about 200 $m^2/g$ to about 600 $m^2/g$, a surfactant, wherein the surfactant is a charged surfactant comprising an amine and/or amide group, and a polymer.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
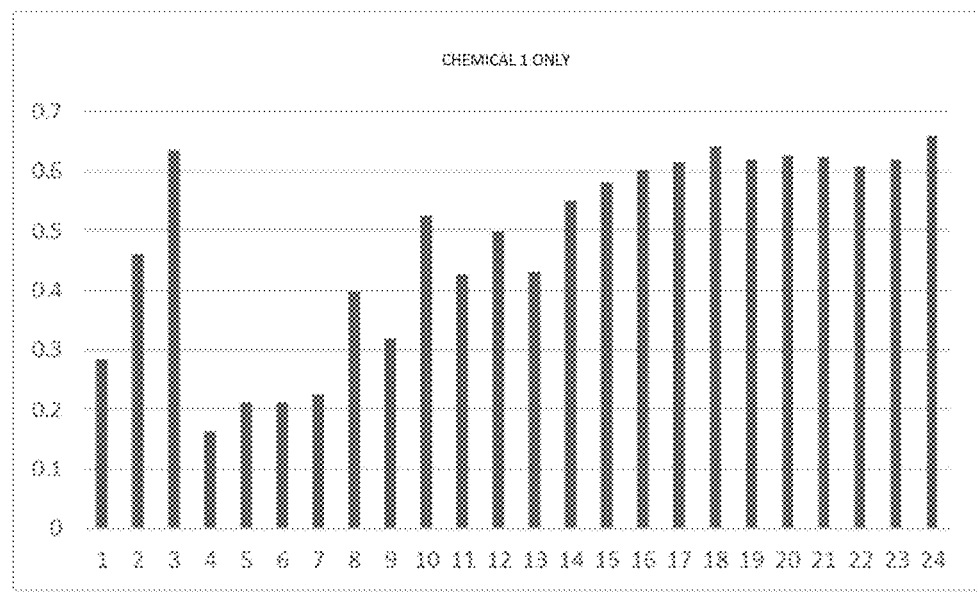
FIGS. 1-3 show the results of slow-release versus non-slow-release experiments conducted with asphaltene inhibitor compositions with silica (FIGS. 2-3) and without silica (FIG. 1).

Various embodiments are described below. The relationship and functioning of the various elements of the embodiments may be better understood by reference to the following detailed description. However, embodiments are not limited to those explicitly described and exemplified.

Unless otherwise defined, all technical and scientific terms used herein have the same meaning as commonly understood by one of ordinary skill in the art. In case of conflict, the present document will control. Preferred methods and materials are described herein although methods and materials similar or equivalent to those described herein can be used in practice or testing of embodiments of the present disclosure. The materials, methods, and examples disclosed herein are illustrative only and not intended to be limiting.

The asphaltene inhibitor compositions provided herein can be used in methods for dispersing, controlling, and/or inhibiting formation of asphaltenes in an asphaltene-containing sample, such as a hydrocarbon (e.g., crude oil). The compositions can also prevent asphaltene deposition. Asphaltene deposition can occur onto any surface involved in the production, extraction and/or refinement of crude oil. For example, the surface can comprise a formation, a pump, a tube, a wellhead, a valve (e.g., safety valve), a flow line, and/or a surface facility used in extraction.

Asphaltene precipitation can be caused by a number of factors including changes in pressure, temperature and composition. Frequently, asphaltene precipitation is induced when pressures inside the reservoir decrease. Other processes that can induce precipitation in the near wellbore region include drilling, completion, acid stimulation, and hydraulic fracturing activities.

The methods, compounds, and compositions provided herein are useful for extending the lifetime of an asphaltene inhibitor treatment in a subterranean formation. In some embodiments, an asphaltene inhibitor composition is provided. The composition may comprise silica, a polymer and optionally a charged surfactant.

In some embodiments, the silica may function as a nano-vessel for the asphaltene control chemicals and can be squeezed into subterranean formations. The silica may be immobilized in the rock and slowly release the asphaltene control chemicals (such as polymer and charged surfactant).

In accordance with the present disclosure, the term "asphaltene inhibitor" or "asphaltene inhibitor composition" contemplates a composition comprising, consisting of, or consisting essentially of silica, a polymer, and optionally a charged surfactant. In some embodiments, the asphaltene inhibitor may include other additives, solvents, hydrocarbons, such as crude oil, etc., as further described below.

Silicas have a high storage capacity and can function as nano-vessels for asphaltene control chemicals. In some embodiments, the silica absorbs the asphaltene control chemicals, such as the polymer and surfactant. Silicas can be squeezed into subterranean formations, lodged in the formation rock, and slowly release the asphaltene control chemicals disclosed herein.

In some embodiments, the silica of the present disclosure is water-soluble. For example, the silica may be at least 0.01% water-soluble to about 40% water-soluble, such as from about 0.01% to about 30%, from about 0.01% to about 20%, from about 0.01% to about 10%, from about 0.01% to about 5%, from about 0.5% to about 40%, from about 0.5% to about 30%, from about 0.5% to about 20%, from about 0.5% to about 10%, from about 0.5% to about 5%, from about 1% to about 40%, from about 1% to about 30%, from about 1% to about 20%, from about 1% to about 10%, or from about 1% to about 5%.

Various types of silica may be used in accordance with the present disclosure. For example, the silica may be selected from colloidal silica, mesoporous silica, silica-based nanoparticles, porous silica, non-porous silica, fumed silica, silica gel, and any combination thereof. In certain embodiments, the silica is selected from the group consisting of fumed silica, mesoporous silica, nanosilica, and any combination thereof. In some embodiments, the silica comprises or excludes silicates, silica particulate, and/or precipitated silica.

In some embodiments, the silica comprises a surface area of about 50 m$^2$/g to about 600 m$^2$/g. For example, the silica may comprise a surface area of about 50 m$^2$/g to about 500 m$^2$/g, about 50 m$^2$/g to about 400 m$^2$/g, about 50 m$^2$/g to about 300 m$^2$/g, about 50 m$^2$/g to about 200 m$^2$/g, about 100 m$^2$/g to about 600 m$^2$/g, about 100 m$^2$/g to about 500 m$^2$/g, about 100 m$^2$/g to about 400 m$^2$/g, about 100 m$^2$/g to about 300 m$^2$/g, about 100 m$^2$/g to about 200 m$^2$/g, about 200 m$^2$/g to about 600 m$^2$/g, about 200 m$^2$/g to about 500 m$^2$/g, about 200 m$^2$/g to about 400 m$^2$/g, about 200 m$^2$/g to about 300 m$^2$/g, about 300 m$^2$/g to about 600 m$^2$/g, about 300 m$^2$/g to about 500 m$^2$/g, or about 300 m$^2$/g to about 400 m$^2$/g.

The particle size of the silica is not particularly limited. In some embodiments, the silica comprises a particle size ranging from about 5 nm to about 1,000 nm. For example, the particle size may be selected from about 5 nm to about 800 nm, about 5 nm to about 600 nm, about 5 nm to about 400 nm, about 5 nm to about 200 nm, about 5 nm to about 100 nm, about 5 nm to about 50 nm, about 50 nm to about 800 nm, about 50 nm to about 600 nm, about 50 nm to about 400 nm, about 50 nm to about 200 nm, about 100 nm to about 800 nm, about 100 nm to about 600 nm, about 100 nm to about 400 nm, or about 100 nm to about 200 nm.

The compositions of the present disclosure may comprise varying amounts of silica. For example, the compositions may comprise from about 1 wt. % to about 95 wt. %, from about 1 wt. % to about 85 wt. %, from about 1 wt. % to about 75 wt. %, from about 1 wt. % to about 65 wt. %, from about 1 wt. % to about 55 wt. %, from about 1 wt. % to about 45 wt. %, from about 1 wt. % to about 35 wt. %, from about 1 wt. % to about 25 wt. %, from about 1 wt. % to about 15 wt. %, from about 1 wt. % to about 5 wt. %, from about 3 wt. % to about 5 wt. %, from about 3 wt. % to about 15 wt. %, from about 3 wt. % to about 25 wt. %, from about 3 wt. % to about 35 wt. %, from about 3 wt. % to about 45 wt. %, from about 3 wt. % to about 55 wt. %, from about 5 wt. % to about 50 wt. %, from about 5 wt. % to about 40 wt. %, from about 5 wt. % to about 30 wt. %, from about 5 wt. % to about 20 wt. %, or from about 5 wt. % to about 10 wt. % of the silica.

The optional surfactant component of the asphaltene inhibitor composition is a charged surfactant comprising an amine and/or amide group. The charged surfactant may be, for example, an anionic surfactant, a partially negative/anionic surfactant, a cationic surfactant, a partially positive/cationic surfactant, an amphoteric surfactant, a zwitterionic surfactant, or any combination thereof. In some embodiments, the charged surfactant comprises an imidazoline or an imidazolinium.

The charged surfactant may comprise a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

In some embodiments, the charged surfactant comprises a member selected from the group consisting of

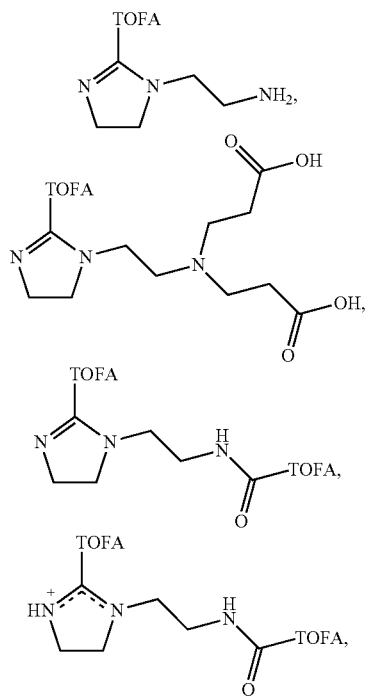

and any combination thereof. If necessary, an appropriate counter ion can be selected by one of ordinary skill in the art. In some embodiments, the counter ion may be the molecule itself, such as in the case of a zwitterionic surfactant. In some embodiments, the counter ion may be a proton, for example. In certain embodiments, the charged surfactant is nonpolymeric.

The charged surfactant may be, for example, an alkyl ($C_1$-$C_{30}$ including unsaturated and/or branched versions thereof) carboxylic acid/polyethylene amine imidazoline condensate or an acrylated (e.g., acrylic acid) version thereof, an alkyl imidazoline or alkyl imidazolinium, an alkyl ($C_1$-$C_{30}$ including saturated and unsaturated versions thereof) amine, linear and branched alkyl and aryl phosphate acid esters, thioesters, and amine/amide analogues. The charged surfactant may also be, for example, tall oil/diethylene triamine (DETA) imidazoline condensates or acrylated (acrylic acid) versions thereof, oleylamine, cocoamine, tall oil amines, and/or 2-ethylhexyl phosphate ester.

The charged surfactant comprises a weight average molecular weight ranging from about 100 Da to about 1,000 Da. In some embodiments, the weight average molecular weight ranges from about 100 Da to about 800 Da, from about 100 Da to about 600 Da, from about 300 Da to about 1,000 Da, or from about 500 Da to about 1,000 Da, for example.

In some embodiments, the weight ratio of surfactant to silica is about 100:1 to about 1:100, such as about 1:1 to about 1:100. In some embodiments, the weight ratio is about 50:1 to about 1:100, about 20:1 to about 1:100, about 10:1 to about 1:100, about 1:5 to about 1:100, about 1:10 to about 1:100, about 1:30 to about 1:100, about 1:50 to about 1:100, about 1:70 to about 1:100, about 1:90 to about 1:100, about 1:1 to about 1:80, about 1:1 to about 1:60, about 1:1 to about 1:40, about 1:1 to about 1:20, about 1:1 to about 1:10, about 1:1 to about 1:8, about 1:1 to about 1:6, about 1:1 to about 1:4, or about 1:1 to about 1:2.

The polymer of the present disclosure functions as an asphaltene inhibitor. In some embodiments, the polymer prohibits the asphaltenes from sticking together while the surfactant prevents the polymer/asphaltene agglomerants from sticking to each other.

In certain embodiments, the polymer is nonionic. In some embodiments, the polymer comprises a monomer selected from the group consisting of isobutylene, butadiene, isoprene, ethylene, propylene, an acrylate, acrylamide, methacrylate, methacrylamide, and any combination thereof.

In some embodiments, the polymer is an alkyl phenol-formaldehyde polymer, an alkyl phenol-amine-formaldehyde polymer, a polyalkylene, a polyisobutylene succinic ester or a polyisobutylene succinimide.

In certain embodiments, the polymer comprises about 10 mole % to about 90 mole % of a nonylphenol and about 10 mole % to about 90 mole % of formaldehyde. In some embodiments, the polymer comprises about 25 mole % to about 75 mole % of a nonylphenol and about 25 mole % to about 75 mole % of formaldehyde. In some embodiments, the polymer comprises about 45 mole % to about 55 mole % of a nonylphenol and about 45 mole % to about 55 mole % of formaldehyde. In certain embodiments, the polymer is a polyisobutylene succinic anhydride pentaerythritol ester, a dinonylphenol-formaldehyde-nonylphenol polymer, or a 4-nonylphenol-formaldehyde-diethylenetriamine.

The polymer may optionally be selected from aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; amphoteric fatty acids; salts of alkyl succinates; and polyisobutylene succinic anhydride.

In some embodiments, the polymer may be an alkyl ($C_1$-$C_{30}$, $C_4$-$C_{10}$, etc.) phenol-formaldehyde polymer resin including variants with diamines, polyisobutylene succinic anhydride ester and imide resins (PIBSAs), polyalkylacrylates and polymethalkylacrylates ($C_1$-$C_{30}$, $C_8$-$C_{30}$, $C_8$-$C_{20}$, etc.).

The molecular weight of the polymer is not particularly limited. In some embodiments, the polymer comprises a weight average molecular weight ranging from about 500 Da to about 500,000 Da. For example, the polymer may comprise a weight average molecular weight from about 500 Da to about 300,000 Da, from about 500 Da to about 200,000 Da, from about 500 Da to about 100,000 Da, from about 500 Da to about 90,000 Da, from about 500 Da to about 80,000 Da, from about 500 Da to about 70,000 Da, from about 500 Da to about 60,000 Da, from about 500 Da to about 50,000 Da, from about 500 Da to about 40,000 Da, from about 500 Da to about 30,000 Da, from about 500 Da to about 20,000 Da, or from about 500 Da to about 10,000 Da.

In some embodiments, the weight ratio of polymer to silica is about 100:1 to about 1:100, such as about 1:1 to about 1:100. In some embodiments, the weight ratio is about 50:1 to about 1:100, about 20:1 to about 1:100, about 10:1 to about 1:100, about 1:5 to about 1:100, about 1:10 to about 1:100, about 1:30 to about 1:100, about 1:50 to about 1:100, about 1:70 to about 1:100, about 1:90 to about 1:100, about 1:1 to about 1:90, about 1:1 to about 1:70, about 1:1 to about 1:50, about 1:1 to about 1:30, about 1:1 to about 1:10, about 1:1 to about 1:8, about 1:1 to about 1:6, about 1:1 to about 1:4, or about 1:1 to about 1:2.

In some embodiments, the asphaltene inhibitor composition consists of the silica, the polymer and optionally the charged surfactant or consists essentially of the silica, the polymer and optionally the charged surfactant. In some embodiments, the asphaltene inhibitor composition consists of the silica, the polymer, optionally the charged surfactant, and a solvent or consists essentially of the silica, the polymer, optionally the charged surfactant, and the solvent. In certain embodiments, the solvent consists of, or consists essentially of, the silica, the polymer, and optionally the charged surfactant and in other embodiments, the solvent consists of, or consists essentially of, the silica, the polymer, optionally the charged surfactant, and an additive.

The solvent is not particularly limited and, in some embodiments, may be selected from an aromatic solvent, an aromatic solvent mixed with any amount of a non-aromatic solvent, including linear and/or branched alkyl alcohols ($C_1$-$C_{12}$, for example), an aromatic alcohol, such as benzyl alcohol, a linear and/or branched alkane ($C_1$-$C_{12}$, for example), toluene, xylene, a mixture of toluene and xylene, a mixture of toluene, xylene and methanol, ethanol, isopropanol, and/or 2-ethylhexanol.

The asphaltene inhibitors disclosed herein may be formed by imbibition of a polymer and optionally a charged surfactant into the silica. Imbibition is suitably accomplished by contacting the silica with an imbibition solvent and the selected polymer and optional charged surfactant, resulting in formation of the asphaltene inhibitor.

In some embodiments, silica is imbibed by contacting the silica with an imbibition solvent, a polymer, and optionally a charged surfactant. In any of the embodiments described herein, the optional charged surfactant, polymer or charged surfactant/polymer mixture may be dispersed in the imbibition solvent at any ratio that facilitates dispersion or dissolution, and mixing, of the silica, the optional charged surfactant and the polymer. The imbibition solvent may be, for example, water, a solvent that is water-miscible, or a blend of water and one or more water-miscible solvents. The imbibition solvent may be any solvent provided in the present disclosure. In some embodiments, an optional charged surfactant, polymer, and/or a mixture thereof is dispersed in water, and water is the imbibition solvent. In other embodiments, the imbibition solvent is an aqueous solution of water and one or more water-miscible solvents. In some embodiments, a hydrotrope is included in the imbibition solvent to facilitate dispersion of silica, optional charged surfactant, polymer, or any combination thereof. In some embodiments, the imbibition solvent may include one or more agents to adjust the pH of the imbibition solvent. In some embodiments, the imbibition solvent optionally comprises one or more additives disclosed herein.

In some embodiments, the solvent is recoverable by evaporation and may be re-used to disperse a fresh batch of surfactant/polymer for imbibition. Useful and non-limiting imbibition solvents include water, methanol, ethanol, acetone, methyl ethyl ketone, isopropanol, benzene, and toluene. Blends of these, further with other solvents and/or hydrotropes, are usefully employed as the imbibition solvent.

In some embodiments, the imbibing includes contacting the silica with the optional charged surfactant and polymer dissolved or dispersed in the imbibition solvent. In certain embodiments, the contacting is accompanied by a reduced pressure. Reduced pressure means sub-atmospheric pressure, or pressure of less than 1 atm. Reducing pressure in the presence of dissolved or dispersed surfactant and/or polymer increases the rate of imbibition of optional surfactant and/or polymer by the silica to form the asphaltene inhibitor.

In some embodiments, a first reduced pressure is applied to the combination of silica, optional charged surfactant, polymer and imbibition solvent. In certain embodiments, the first reduced pressure is applied cyclically, wherein a period of reduced pressure is followed by a period of higher pressure. In some embodiments the higher pressure is atmospheric pressure, while in other embodiments, the higher pressure is a pressure between atmospheric pressure and the first reduced pressure. Thus, in embodiments, the imbibing may be accompanied by one, two, three, four, five, or more than five cycles of reduced pressure and as many as 100 or more cycles of reduced pressure. In some embodiments, the first reduced pressure is the same as the reduced pressure applied in subsequent cycles, while in other embodiments, the reduced pressure is variable between cycles. That is, in embodiments, the first reduced pressure, the higher pressure, or both may vary purposefully or incidentally over two or more cycles.

In some embodiments, including embodiments wherein a reduced pressure is applied, the imbibition is accompanied by a targeted temperature of about −40° C. to about 100° C., such as about 0° C. to about 100° C., or about 20° C. to about 100° C., or about 40° C. to about 100° C., or about 60° C. to about 100° C., or about 80° C. to about 100° C., or about −40° C. to about 90° C., or about −40° C. to about 70° C., or about −40° C. to about 50° C., or about −40° C. to about 30° C., or about −40° C. to about 10° C., or about −40° C. to about 0° C.

In some embodiments, the imbibition is continued for a period of about 1 minute to about 24 hours after contact of the silica, imbibition solvent, polymer(s), optional charged surfactant(s), and optional additive(s). For example, the imbibition may be continued for about 10 minutes to about 24 hours, or about 30 minutes to about 24 hours, or about 1 hour to about 24 hours, or about 5 hours to about 24 hours, or about 10 hours to about 24 hours, or about 15 hours to about 24 hours, or about 1 minute to about 15 hours, or about 1 minute to about 5 hours, or about 1 minute to about 1 hour. The period is accompanied by 0 to 1000 cycles of a first reduced pressure to result in the formation of the asphaltene inhibitor.

In some embodiments, after imbibition is complete, the imbibition solvent is removed or is substantially removed from the asphaltene inhibitor by evaporation, optionally under reduced pressure and optionally by adding heat to the asphaltene inhibitor in the imbibition solvent. In some embodiments, the imbibition solvent is not removed after completion of imbibition.

After the asphaltene inhibitor is formed, and optionally after further removing a portion or all of the imbibition solvent, the structure may be added to a carrier fluid or it may be stored either as a dry particulate or as a dispersion in a solvent, for example. The solvent is not particularly limited and may be chosen from, for example, any solvent disclosed in the present application. In some embodiments, the carrier fluid is the solvent disclosed herein.

In certain embodiments, the carrier fluid comprises the asphaltene inhibitor composition. The carrier fluid may be aqueous or non-aqueous.

Suitable non-aqueous carriers include alkanols, such as methanol or polyols (e.g., a glycol). In some embodiments, glycols include those of the formula $(CH_2)_n(OH)_2$ wherein n is 2 to 6 (e.g., ethylene glycol). Other suitable non-aqueous carriers include, but are not limited to, aldehydes, diesel, base oil (mineral oil), kerosene, heavy aromatic naptha, xylene, toluene, and petroleum distillates. Non-aqueous carriers may be used, for example, if the reservoir is water-sensitive.

Alternatively, the carrier fluid may be aqueous (e.g., sea water). The aqueous carrier fluid may comprise, for example, clean, filtered, produced brine, or brine prepared by adding inorganic salts, such as KCl or $NH_4Cl$, to water.

In some embodiments, the asphaltene inhibitor may be combined with the carrier fluid using batch mixing. For example, a volume of brine may be contained in a tank and the asphaltene inhibitor, along with any additional additives, may be added to the tank and mixed into the brine. In some embodiments, the combination may be prepared by pumping brine from a source and injecting the asphaltene inhibitor, along with any additional additives, into the flowing brine. The asphaltene inhibitor and any additional additives may be mixed into the brine by means of a static mixer or other mechanical device before entering the wellbore.

The amount of asphaltene inhibitor in the carrier fluid may be from about 1 ppm to about 10,000 ppm. For example, the amount of asphaltene inhibitor in the carrier fluid may be from about 1 ppm to about 8,000 ppm, from about 1 ppm to about 6,000 ppm, from about 1 ppm to about 4,000 ppm, from about 1 ppm to about 2,000 ppm, from about 1 ppm to about 1,000 ppm, from about 1 ppm to about 500 ppm, from about 1,000 ppm to about 10,000 ppm, from about 3,000 ppm to about 10,000 ppm, from about 5,000 ppm to about 10,000 ppm or from about 7,000 ppm to about 10,000 ppm.

The amount of asphaltene inhibitor in the carrier fluid may be selected by one of ordinary skill in the art based on, for example, the type and amount of optional charged surfactant and the subterranean conditions known or expected, including temperature, rock composition, connate composition, and connate/hydrocarbon ratio. In some embodiments, the asphaltene inhibitor is insoluble in the carrier fluid. In certain embodiments, the asphaltene inhibitor is dispersed in the carrier fluid and does not disgorge the surfactant/polymer into the carrier fluid. In some embodiments, the carrier fluid may be at a temperature of about 20° C. to about 80° C. while it is combined with the asphaltene inhibitor.

The carrier fluid and/or asphaltene inhibitor composition may include additional additives for subterranean injection. Illustrative, non-limiting examples of additives include viscosity modifiers, scale control agents, emulsion preventers, emulsifiers, solvents, oxygen scavengers, hydrogen sulfide scavengers, corrosion inhibitors, biocides, stabilizing agents, pH buffering agents, acidulants, friction reducers, defoaming agents, anti-redeposition agents, bleaching agents, solubility modifiers, dispersants, rinse aids, metal protecting agents, emulsion breakers, reverse emulsion breakers, emulsion stabilizers, iron dissolvers, chelating agents, peracid stabilizers, acids, antimicrobial agents, fragrances, dyes, rheology modifiers, hydrotropes, paraffin inhibitors, water clarifiers, hydrate inhibitors, and any combination thereof.

The amount of additive(s) in the carrier fluid and/or asphaltene inhibitor composition is not particularly limited and may be selected by one of skill in the art. In some embodiments, the additive is present in an amount ranging from about 0.0001 wt. % to about 50 wt. %. For example, the additive may be present from about 0.001 wt. % to about 40 wt. %, about 0.001 wt. % to about 30 wt. %, from about 0.001 wt. % to about 20 wt. %, from about 0.01 wt. % to about 20 wt. % or from about 0.01 wt. % to about 10 wt. %.

The present disclosure also provides methods of controlling asphaltenes in a subterranean formation. The subterranean formation may comprise a hydrocarbon. In certain embodiments, the subterranean formation is an oil well or a gas well.

A method of controlling asphaltenes may include adding an asphaltene inhibitor to a hydrocarbon, such as crude oil, in a subterranean formation. The asphaltene inhibitor is as defined herein. Typically, the asphaltene inhibitor is added through a wellbore and pumped into the subterranean formation where it contacts the hydrocarbon.

In some embodiments, the asphaltene inhibitor is added as close to the reservoir as possible, such as at the wellhead or right before the wellhead choke. With this point of addition, the presently disclosed asphaltene inhibitors may protect the near-wellbore region as well as all other regions along the pipeline to the separator.

In some embodiments, application of the asphaltene inhibitor occurs after an intervention or remediation job so the near-wellbore region is as clean as possible. This could help improve adhesion of the asphaltene inhibitor to reservoir substrate.

In some embodiments, a carrier fluid comprises, consists of, or consists essentially of the asphaltene inhibitor composition. If a step consists essentially of adding an asphaltene inhibitor, the step excludes adding compositions, compounds, chemicals, etc., that would materially affect the basic and novel characteristic(s) of the process, which include, in some embodiments, additional surfactants, such as nonionic surfactants, those used in enhanced oil recovery operations, and/or those not meeting the definitions for surfactant provided herein, additional polymers, such as those used in enhanced oil recovery operations and/or those not meeting the definitions for the polymers provided herein, carbon-based nanomaterials, water-insoluble silicas, and/or clay minerals. In certain embodiments, organosilanes, water-insoluble silicas, carbon-based nanomaterials, and/or clay minerals are not added to the subterranean formation while practicing the presently disclosed methods.

When the methods disclosed herein are carried out in connection with squeeze treatments, the asphaltene inhibitor may, but does not need to, be added in a preflush step. The asphaltene inhibitor may also be added in connection with the main pill and/or overflush steps. Additionally, components of the asphaltene inhibitor may be added during different steps. For example, the silica may be added without any surfactant and/or polymer in the prelush, main pill, and/or overflush steps. The polymer may be added without any silica and/or surfactant in the preflush, main pill, and/or overflush steps. Also, the surfactant may be added without any silica and/or polymer in the preflush, main pill, and/or overflush steps.

As used herein, the term "preflush" describes a step in which a reservoir is prepared to undergo treatment with at least an asphaltene inhibitor. The preflush step wets the surfaces within the formation. In some embodiments, the preflush step is carried out by injecting a carrier fluid comprising the asphaltene inhibitor into the subterranean reservoir. In some embodiments, the carrier fluid in the preflush step does not comprise an asphaltene inhibitor composition or any component of the asphaltene inhibitor composition disclosed herein.

As used herein, the term "main pill" describes a method step in which a hydrocarbon in the subterranean formation is contacted with at least a component (polymer, optional surfactant, silica, or any combination thereof) of the asphaltene inhibitor. The term "overflush" describes a method step in which a fluid (with or without one or more components of the asphaltene inhibitor composition) is introduced into the subterranean formation to push, force or displace the asphaltene inhibitor out of the wellbore and into the reservoir. This step is generally carried out because treatment chemicals are usually delivered to the wellbore and although some of the compositions will flow into the reservoir, the process is slow, especially in reservoirs having low permeability. The overflush step, however, creates pressure that forces the treatment chemical into the reservoir. The fluid pumped/injected during the preflush, overflush and/or main pill steps may be any solvent or carrier fluid disclosed herein, such as a brine.

In some embodiments, after the asphaltene inhibitor is delivered to the reservoir, the reservoir may be shut-in for some period of time, such as about 1 hour to about 48 hours, before production resumes.

Examples

Figure 2:
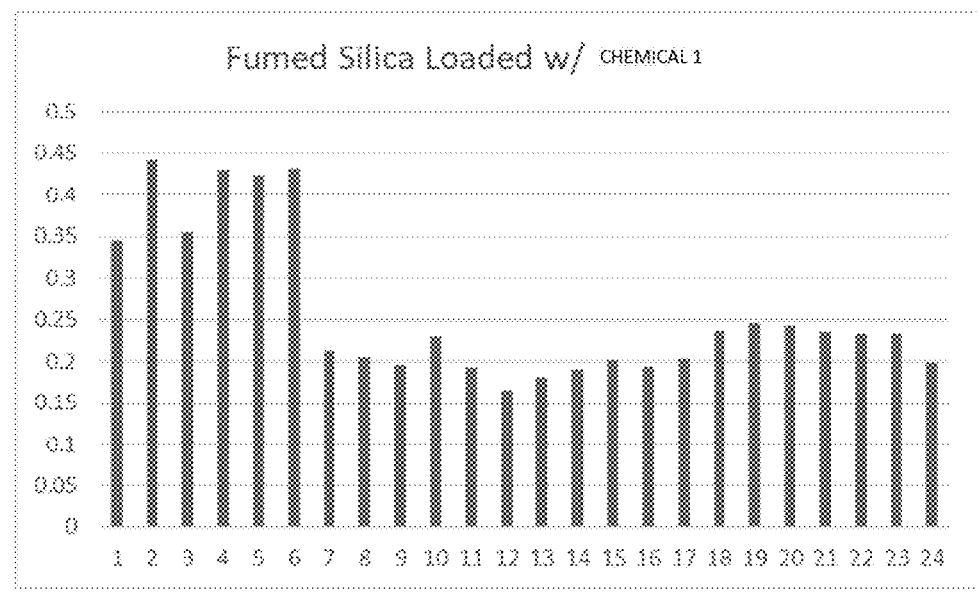
Figure 3:
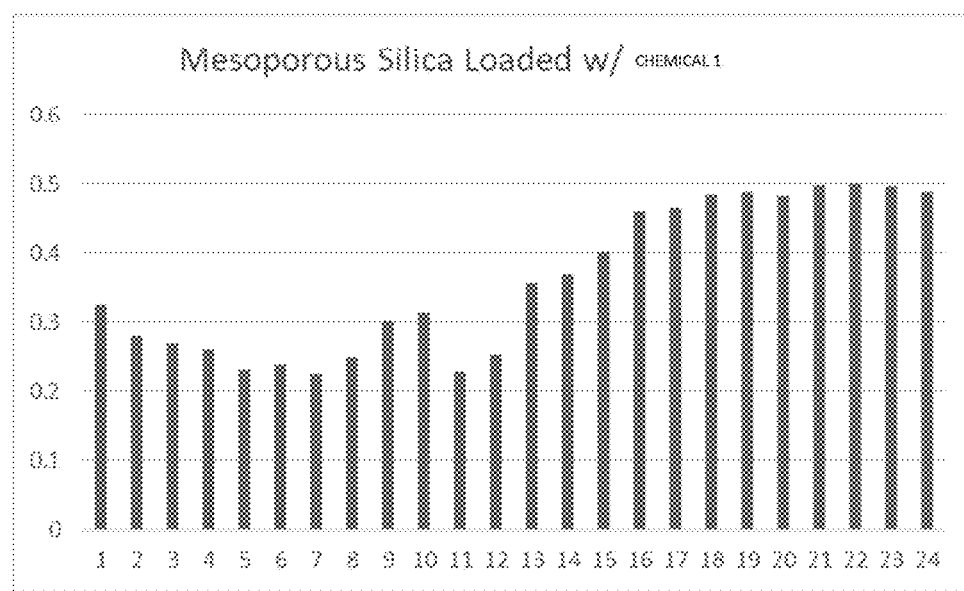

Various release experiments were conducted and the results are depicted in FIGS. 1-3. The release experiments focused on the slow-release of the asphaltene control chemicals from the silica. The asphaltene control chemicals that were tested are defined as follows:

Chemical 1: dinonylphenol-formaldehyde-nonylphenol copolymer, tall oil diethylenetriamine imidazoline, tall oil fatty acids, reaction products of diethylenetriamine and acrylic acid, oleyamine, aromatic solvent, and an alcoholic solvent.

Chemical 2: nonylphenol-formaldehyde polymer resin.

In one trial, Chemical 1 was loaded by itself onto a ground polytetrafluoroethylene (PTFE) powder. The powder was packed into a tube and about 24 mL of oil was flushed through the tube one mL at a time. After each mL was added, a measurement was taken. As can be seen in FIG. 1, asphaltene inhibition began while the fourth mL of oil was added. Very quickly thereafter, the asphaltene inhibition performance began to significantly weaken because the asphaltene control chemicals were being transported out of the tube with the oil.

To prove that the present technology provides slow-release of the asphaltene control chemicals, the same experiment was conducted but this time, Chemical 1 was absorbed in fumed silica. As can be seen in FIG. 2, the asphaltene inhibition began around the seventh mL of oil and was sustained for the remainder of the experiment.

An additional trial was carried out but this time, Chemical 1 was loaded into mesoporous silica. The results are depicted in FIG. 3.

In an additional set of experiments, asphaltene inhibitor silica complexes were made using different concentrations of fumed silica. The baseline was prepared using about 10 wt. % Chemical 2 and about 90 wt. % xylene (Formulation A). Formulation B included about 10 wt. % Chemical 2, about 2 wt. % fumed silica and about 88 wt. % xylene. Formulation C included about 10 wt. % Chemical 2, about 3 wt. % fumed silica and about 87 wt. % xylene. Formulation D included about 10 wt. % Chemical 2, about 4 wt. % fumed silica and about 86 wt. % xylene. Each of Formulations B-D were heated to reflux temperature for about 2-3 hours and then cooled to room temperature. Finally, they were subjected to sonication. Formulations A-D were then evaluated for adsorption/desorption studies using the experimental procedures outlined above. After initially saturating the column at room temperature with customer oil, about one pore volume of each formulation was injected and the columns were shut down for about 12 hours. Finally, the oil was flowed back and effluents were collected. Effluents were tested using a benchtop method where about 4.9 ml of heptane was mixed with about 0.1 ml of effluent oil and asphaltene fall out was visually observed for about 1 hour. Formulation A (baseline) protected about 10 pore volumes of oil while Formulation B, Formulation C, and Formulation D protected 15 pore volumes, 40 pore volumes and 70 pore volumes, respectively.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a polymer" is intended to include "at least one polymer" or "one or more polymers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of controlling asphaltenes, comprising:
   adding an asphaltene inhibitor to a hydrocarbon in a subterranean formation, wherein the asphaltene inhibitor comprises:
   silica, wherein the silica is at least partially water-soluble;
   a charged surfactant, wherein the charged surfactant comprises an imidazoline or an imidazolinium; and
   a polymer, wherein the polymer is a polyisobutylene succinic anhydride pentaerythritol ester polymer, a dinonylphenol-formaldehyde-nonylphenol polymer, or a 4-nonylphenol-formaldehyde-diethylenetriamine polymer.

2. The method of claim 1, wherein the charged surfactant comprises a weight average molecular weight ranging from about 100 Da to about 1,000 Da.

3. The method of claim 1, wherein the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

4. The method of claim 1, wherein the charged surfactant comprises a member selected from the group consisting of

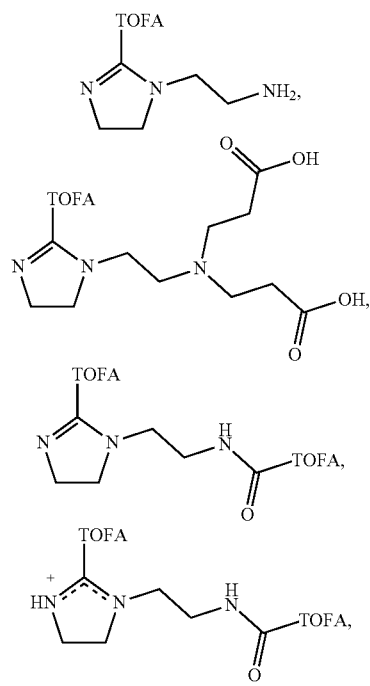

and any combination thereof.

5. The method of claim 1, wherein the charged surfactant is nonpolymeric.

6. The method of claim 1, wherein the polymer comprises a weight average molecular weight ranging from about 500 Da to about 500,000 Da.

7. The method of claim 1, wherein the polymer comprises about 10 mole % to about 90 mole % of a nonylphenol and about 10 mole % to about 90 mole % of formaldehyde.

8. The method of claim 1, wherein the silica is at least 0.01% water-soluble to about 40% water-soluble.

9. The method of claim 1, wherein the silica comprises a surface area of about 200 m²/g to about 600 m²/g.

10. The method of claim 1, wherein the asphaltene inhibitor comprises from about 1 wt. % to about 95 wt. % of the polymer, from about 1 wt. % to about 50 wt. % of the charged surfactant, and from about 1 wt. % to about 95 wt. % of the silica.

11. The composition of claim 1, wherein the silica is about 0.5% water-soluble to about 40% water-soluble.

12. A method of controlling asphaltenes in a subterranean formation, comprising:
preflushing the subterranean formation with an aqueous solution,
delivering an asphaltene inhibitor to a wellbore of the subterranean formation, wherein the asphaltene inhibitor comprises:
silica, wherein the silica is at least partially water-soluble;
a charged surfactant, wherein the charged surfactant comprises an imidazoline or an imidazolinium; and
a polymer, wherein the polymer is a polyisobutylene succinic anhydride pentaerythritol ester polymer, a dinonylphenol-formaldehyde-nonylphenol polymer, or a 4-nonylphenol-formaldehyde-diethylenetriamine polymer,
transporting the asphaltene inhibitor to a surface within the subterranean formation, and
controlling asphaltenes in the subterranean formation.

13. The composition of claim 12, wherein the silica is about 0.5% water-soluble to about 40% water-soluble.

14. A composition, comprising:
(a) silica, wherein the silica is at least partially water-soluble,
(b) a charged surfactant, wherein the charged surfactant comprises an imidazoline or an imidazolinium, and
(c) a polymer, wherein the polymer is a polyisobutylene succinic anhydride pentaerythritol ester polymer, a dinonylphenol-formaldehyde-nonylphenol polymer, or a 4-nonylphenol-formaldehyde-diethylenetriamine polymer.

15. The composition of claim 14, wherein the charged surfactant comprises a member selected from the group consisting of

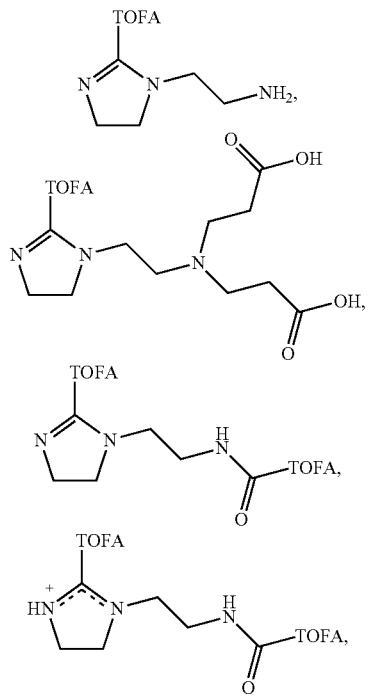

and any combination thereof.

16. The composition of claim 14, wherein the silica comprises a surface area of about 200 m²/g to about 600 m²/g.

17. The composition of claim 14, wherein the charged surfactant comprises a member selected from the group consisting of diethylene triamine (DETA)/tall oil fatty acid (TOFA)-imidazoline, DETA/TOFA-imidazoline acrylate, DETA/TOFA-imidazolinium, DETA/TOFA-imidazolinium acrylate, and any combination thereof.

18. The composition of claim 14, wherein the silica is about 0.5% water-soluble to about 40% water-soluble.

* * * * *